US010635338B2

(12) United States Patent
Gopal et al.

(10) Patent No.: US 10,635,338 B2
(45) Date of Patent: Apr. 28, 2020

(54) TECHNOLOGIES FOR A HIGH-RATIO COMPRESSION ACCELERATOR WITH HETEROGENEOUS HISTORY BUFFERS

(71) Applicant: Intel Corporation, Santa Clara, CA (US)

(72) Inventors: Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 15/720,162

(22) Filed: Sep. 29, 2017

(65) Prior Publication Data

US 2018/0152202 A1     May 31, 2018

Related U.S. Application Data

(60) Provisional application No. 62/427,268, filed on Nov. 29, 2016.

(30) Foreign Application Priority Data

Aug. 30, 2017    (IN) .............................. 201741030632

(51) Int. Cl.
*G06F 17/00*       (2019.01)
*G06F 3/06*        (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC .... G06F 3/0604; G06F 3/0641; G06F 3/0608; G06F 3/065; G06F 3/067; G06F 3/0611;
(Continued)

(56) References Cited

U.S. PATENT DOCUMENTS 9,690,488 B2 *   6/2017   Gopal .................... G06F 3/0608
9,876,509 B2 *   1/2018   Gopal ................. H03M 7/4037
(Continued)

OTHER PUBLICATIONS

Talal Bonny et al., FBT: Filled Buffer Technique to Reduce Code Size for VLIW Processors, ICCAD' 08: Proceesings of the 2008 IEEE/ACM International Conference on Computer-Aided Design, pp. 549-554, November (Year: 2008).*
(Continued)

*Primary Examiner* — Greta L Robinson
(74) *Attorney, Agent, or Firm* — Barnes & Thornburg LLP

(57) ABSTRACT

Technologies for high-ratio compression with heterogeneous history buffers include a computing device having an accelerator complex with a large history buffer and a small history buffer. The large history buffer has a larger size than the small history buffer. For example, the small history buffer may be 32 kilobytes and the large history buffer may be 64 kilobytes, 1 megabyte, or larger. The large history buffer is coupled to a large-buffer compare core that searches for matches in the large history buffer, finds a best match, and forwards the best match to a small-buffer compare core. The small-buffer compare core searches the small history buffer for matches, receives the match forwarded from the large-buffer compare core, and determines a best match from the matches in the small history buffer and the forwarded match. Other embodiments are described and claimed.

25 Claims, 16 Drawing Sheets

(51) Int. Cl.
*G06F 16/174* (2019.01)
*G06F 21/57* (2013.01)
*G06F 21/73* (2013.01)
*G06F 8/65* (2018.01)
*H04L 12/24* (2006.01)
*H04L 29/08* (2006.01)
*G06F 11/30* (2006.01)
*G06F 9/50* (2006.01)
*H03M 7/30* (2006.01)
*H03M 7/40* (2006.01)
*H04L 12/26* (2006.01)
*H04L 12/813* (2013.01)
*H04L 12/851* (2013.01)
*G06F 11/07* (2006.01)
*G06F 11/34* (2006.01)
*G06F 7/06* (2006.01)
*G06T 9/00* (2006.01)
*H03M 7/42* (2006.01)
*H04L 12/28* (2006.01)
*H04L 12/46* (2006.01)
*H04L 29/12* (2006.01)
*G06F 13/16* (2006.01)
*G06F 21/62* (2013.01)
*G06F 21/76* (2013.01)
*H03K 19/173* (2006.01)
*H04L 9/08* (2006.01)
*H04L 12/933* (2013.01)
*G06F 9/38* (2018.01)
*G06F 9/48* (2006.01)
*G06F 12/02* (2006.01)
*G06F 12/06* (2006.01)
*G06T 1/20* (2006.01)
*G06T 1/60* (2006.01)
*G06F 9/54* (2006.01)
*G06F 8/656* (2018.01)
*G06F 8/658* (2018.01)
*G06F 8/654* (2018.01)
*G06F 9/4401* (2018.01)
*H01R 13/453* (2006.01)
*H01R 13/631* (2006.01)
*H05K 7/14* (2006.01)
*H04L 12/911* (2013.01)
*G06F 11/14* (2006.01)
*H04L 29/06* (2006.01)
*G06F 15/80* (2006.01)

(52) U.S. Cl.
CPC .......... *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4881* (2013.01); *G06F 9/505* (2013.01); *G06F 9/5005* (2013.01); *G06F 9/5038* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC .... G06F 3/0613; G06F 3/0617; G06F 3/0647; G06F 3/0653; G06F 8/656; G06F 8/658; G06F 8/654; G06F 15/80; G06F 16/1744; G06F 8/65; G06F 21/57; G06F 21/73; G06F 21/6218; G06F 21/76; G06F 11/0709; G06F 11/0751; G06F 11/079; G06F 11/3006; G06F 11/3409; G06F 11/1453; G06F 11/3034; G06F 11/3055; G06F 7/06; G06F 13/1652; G06F 9/3851; G06F 9/3891; G06F 9/4401; G06F 9/4881; G06F 9/505; G06F 9/5038; G06F 9/544; G06F 12/0284; G06F 12/0692; G06F 12/023; G06F 2212/401; G06F 2212/402; G06F 2212/2107; H04L 43/08; H04L 43/04; H04L 43/06; H04L 43/0894; H04L 47/78; H04L 47/20; H04L 47/2441; H04L 41/0816; H04L 41/0853; H04L 41/12; H04L 41/044; H04L 41/046; H04L 41/0896; H04L 41/142; H04L 67/10; H04L 67/1014; H04L 67/2007; H04L 67/327; H04L 67/36; H04L 49/104; H04L 9/0822; H04L 63/1425; H03K 19/1731; H03M 7/6017; H03M 7/60; H03M 7/40; H03M 7/6011; H03M 7/6029; H03M 7/3084; H03M 7/42; H03M 7/2881; H03M 7/4633; G06T 9/005; G06T 1/20;

G06T 1/60; H01R 13/4538; H01R 13/631; H05K 7/1452; H05K 7/1487
See application file for complete search history.

(56) References Cited

U.S. PATENT DOCUMENTS

| | | | |
|---|---|---|---|
| 10,404,836 B2 * | 9/2019 | Guilford | H04L 69/12 |
| 2014/0266816 A1 * | 9/2014 | Litvak | H03M 7/3084 |
| | | | 341/51 |
| 2017/0177404 A1 * | 6/2017 | Drysdale | G06F 9/466 |

OTHER PUBLICATIONS

Gordon V. Cormack, Data Compression on a Database System, Communications of the ACM, vol. 28 No. 12, pp. 1336-1342, December (Year: 1985).*

* cited by examiner

TECHNOLOGIES FOR A HIGH-RATIO COMPRESSION ACCELERATOR WITH HETEROGENEOUS HISTORY BUFFERS

CROSS-REFERENCE TO RELATED APPLICATIONS

The present application claims the benefit of U.S. Provisional Patent Application No. 62/427,268, filed Nov. 29, 2016 and Indian Provisional Patent Application No. 201741030632, filed Aug. 30, 2017.

BACKGROUND

Data compression is an important computer operation used in many computing applications, including both server and client applications. For example, data compression may be used to reduce network bandwidth requirements and/or storage requirements for cloud computing applications. Many common lossless compression formats are based on the LZ77 compression algorithm. Data compressed using LZ77-based algorithms typically include a stream of symbols (or "tokens"). Each symbol may include literal data that is to be copied to the output or a reference to repeat data that has already been decompressed. The DEFLATE algorithm uses LZ77 compression in combination with Huffman encoding to generate compressed output. The DEFLATE algorithm uses a 32-kilobyte history window when searching for matching data. Other, newer compression algorithms may use larger history windows. For example, the Brotli and ZStandard compression algorithms use history windows in the megabyte range.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
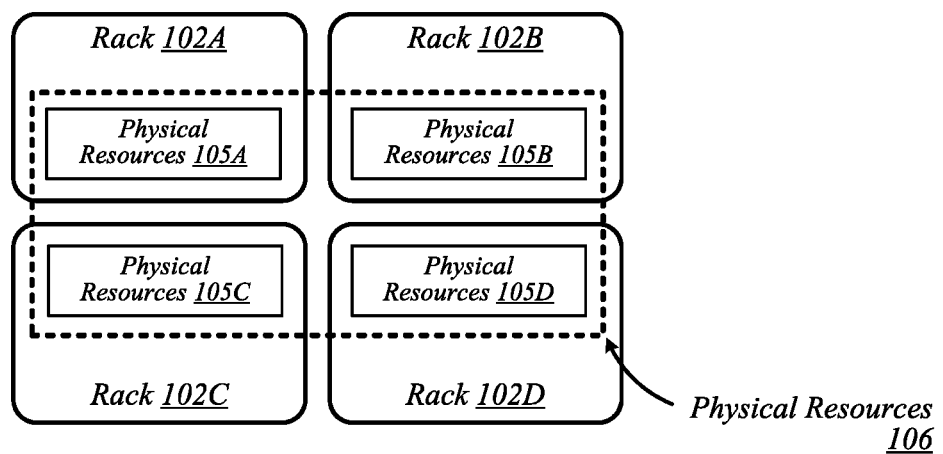
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
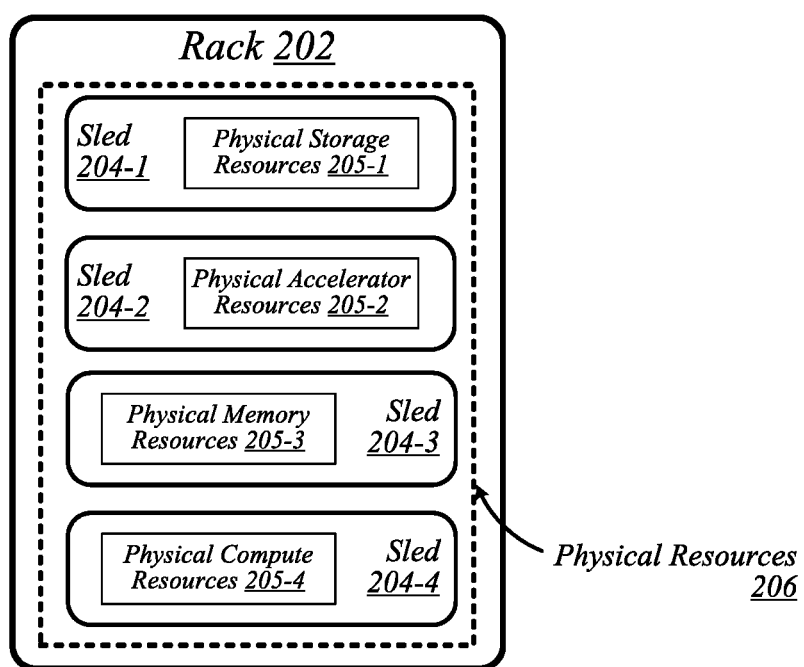
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
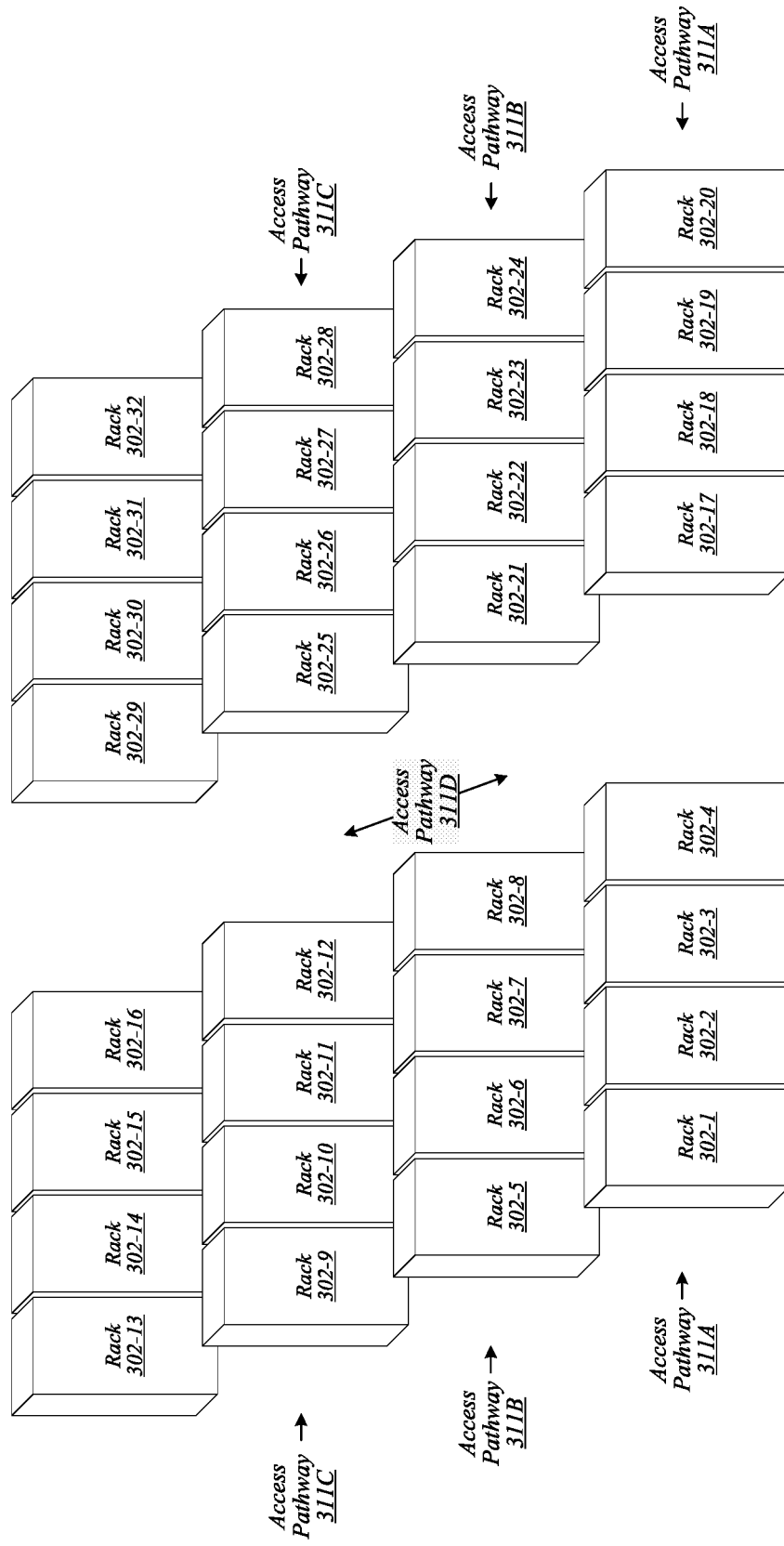
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
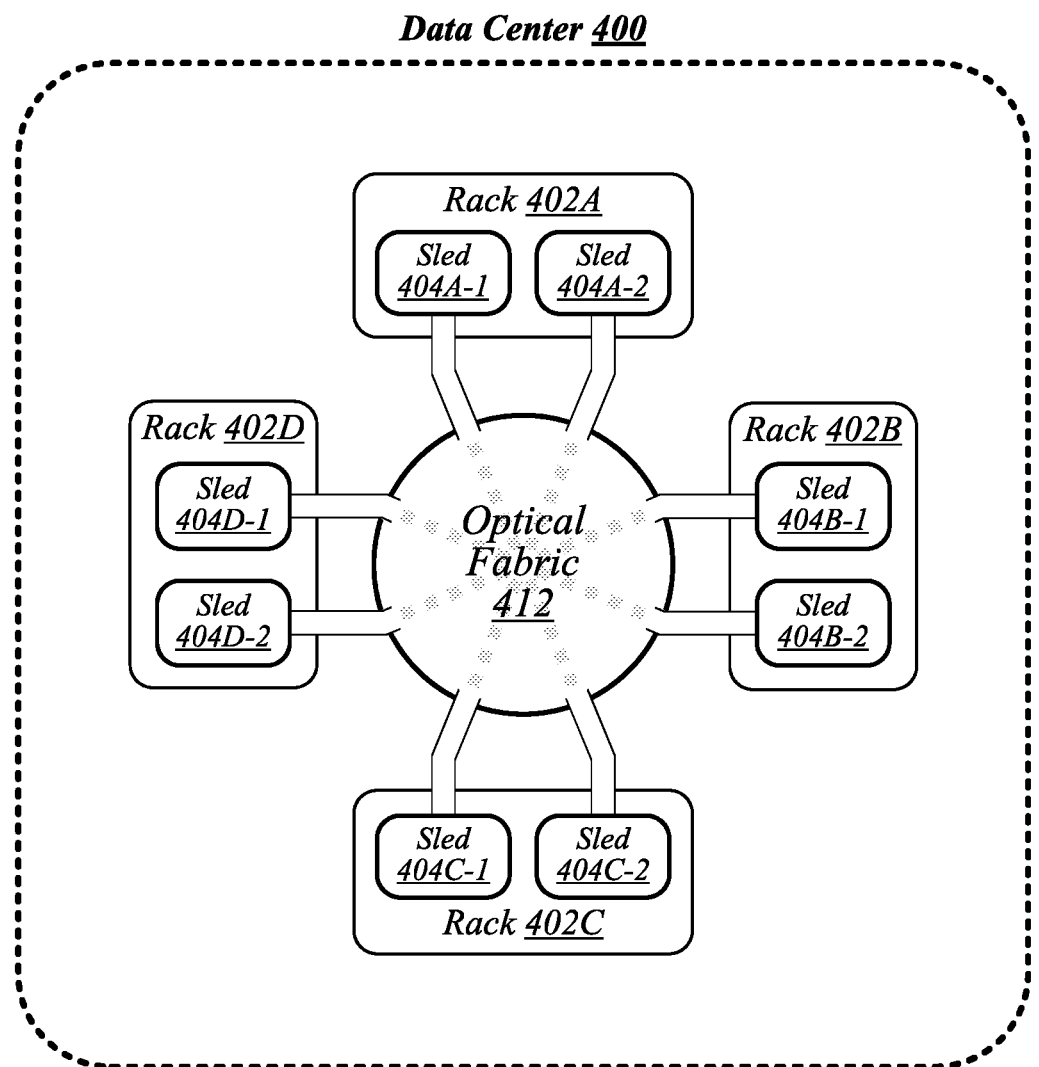
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
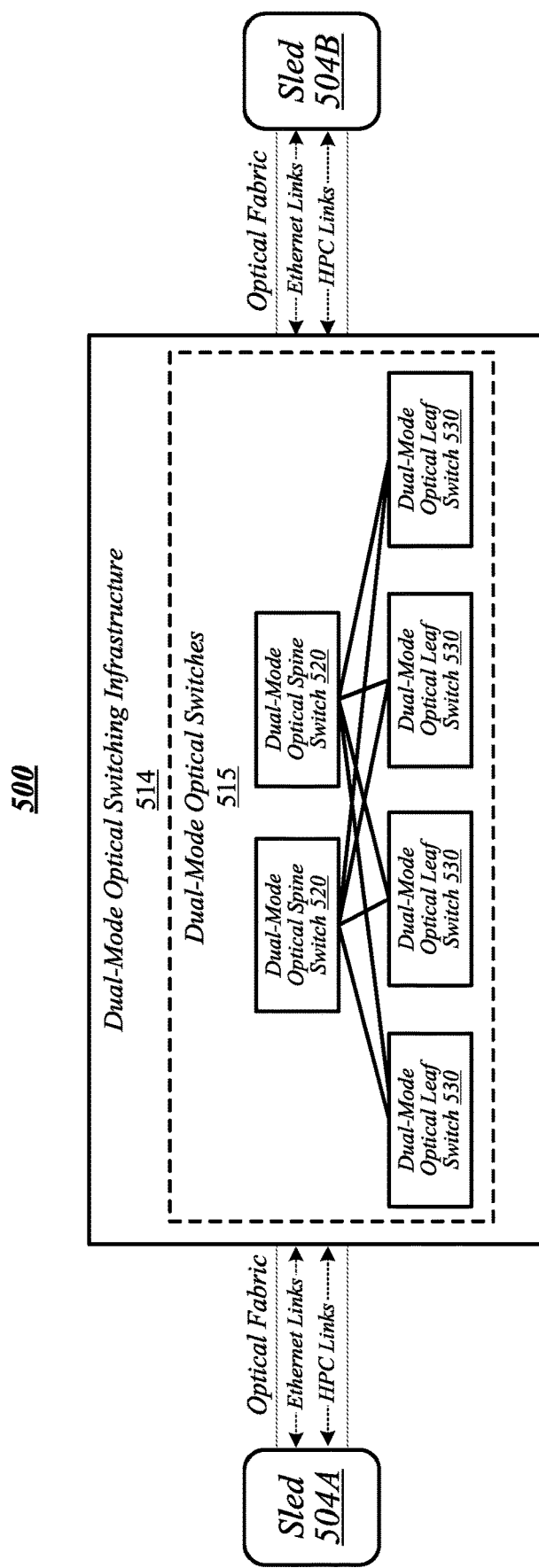
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
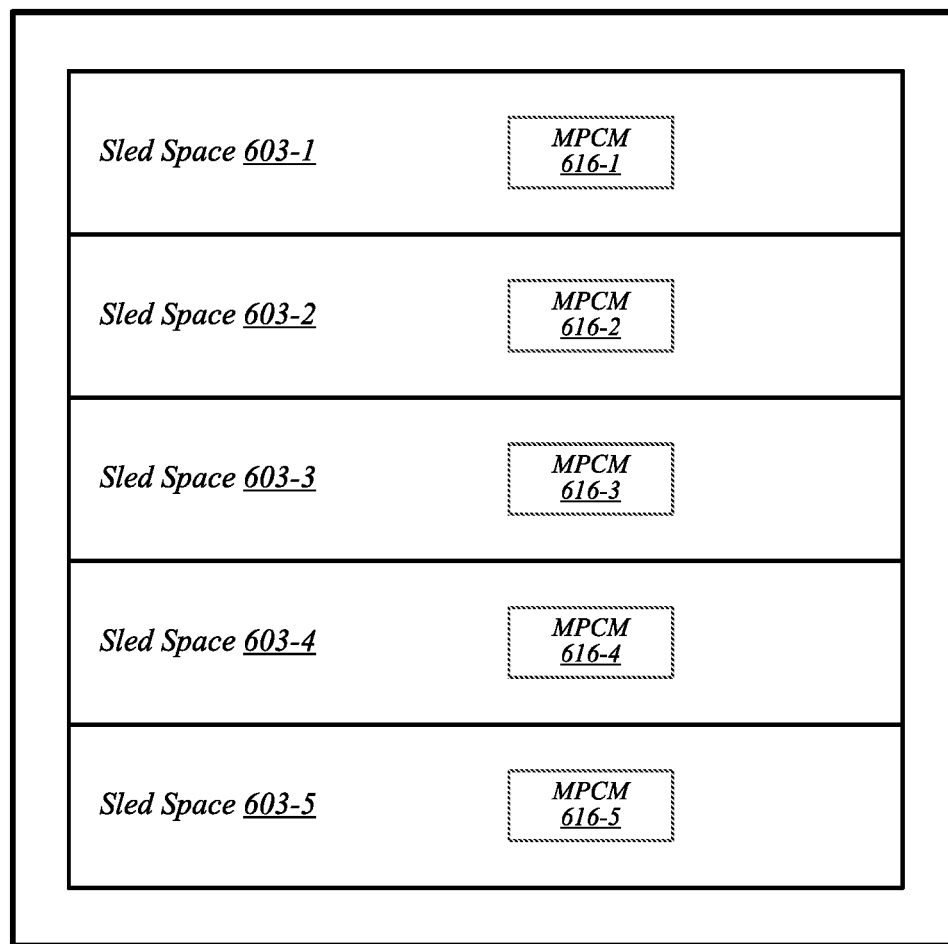
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
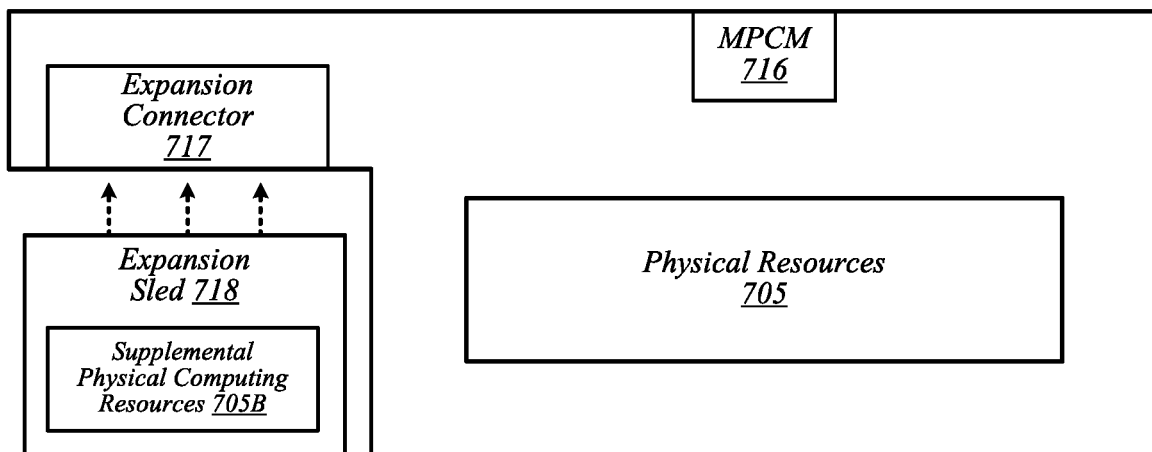
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
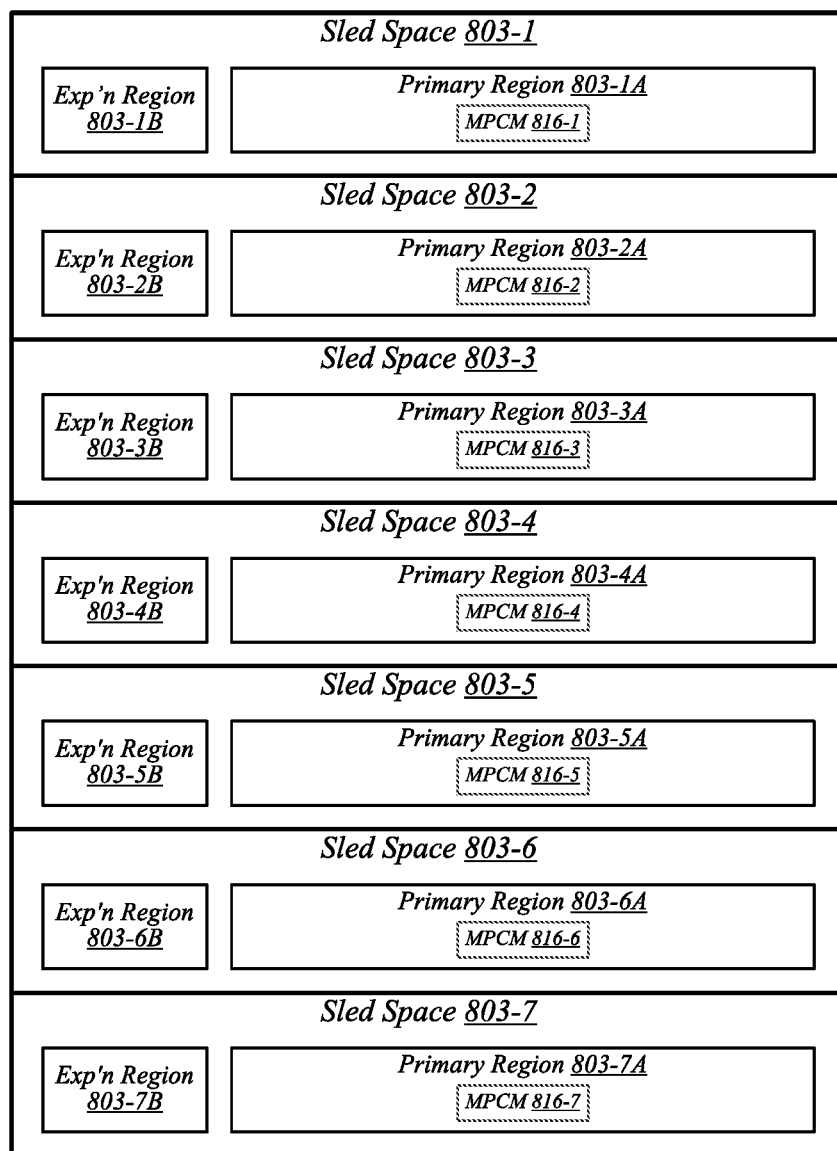
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
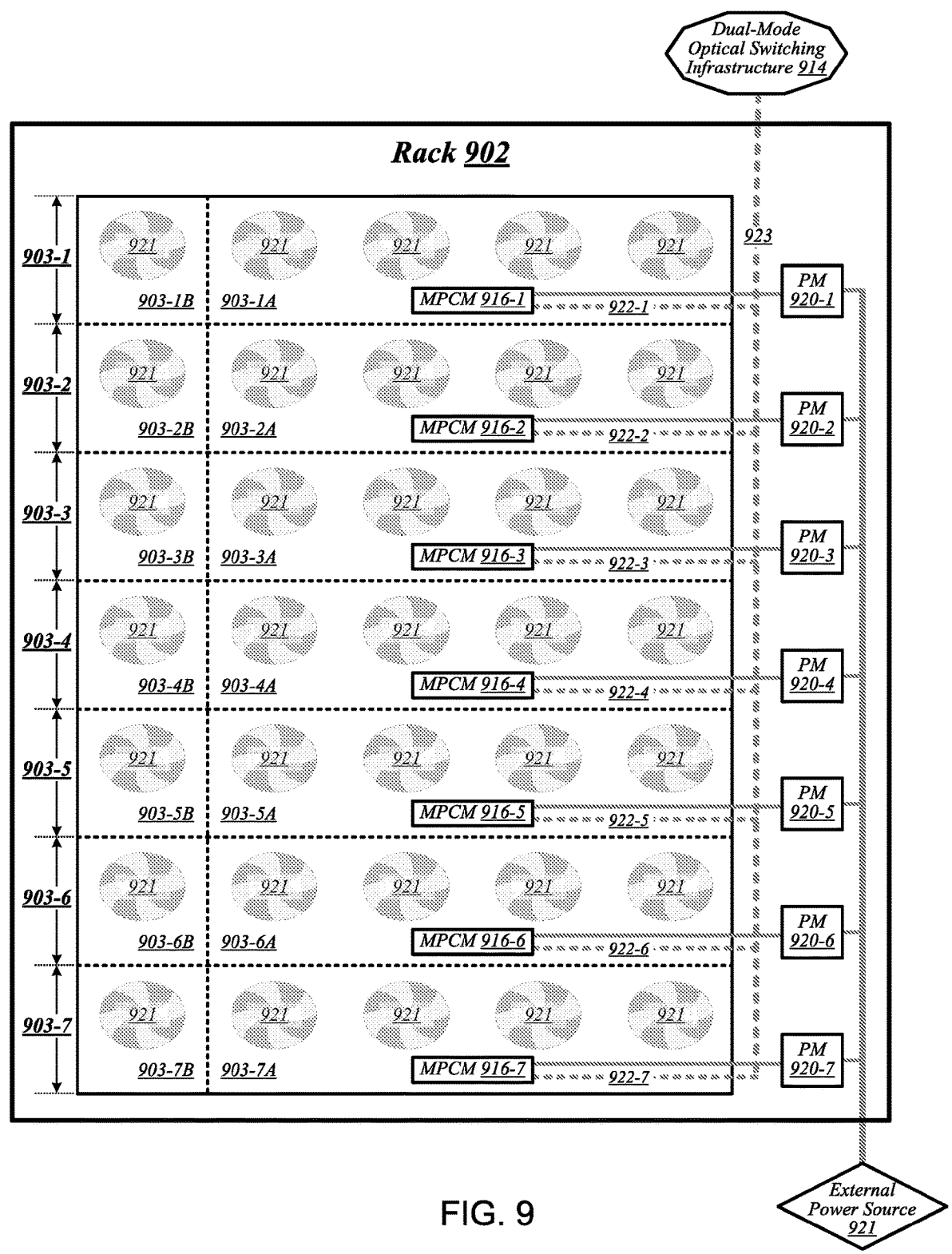
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
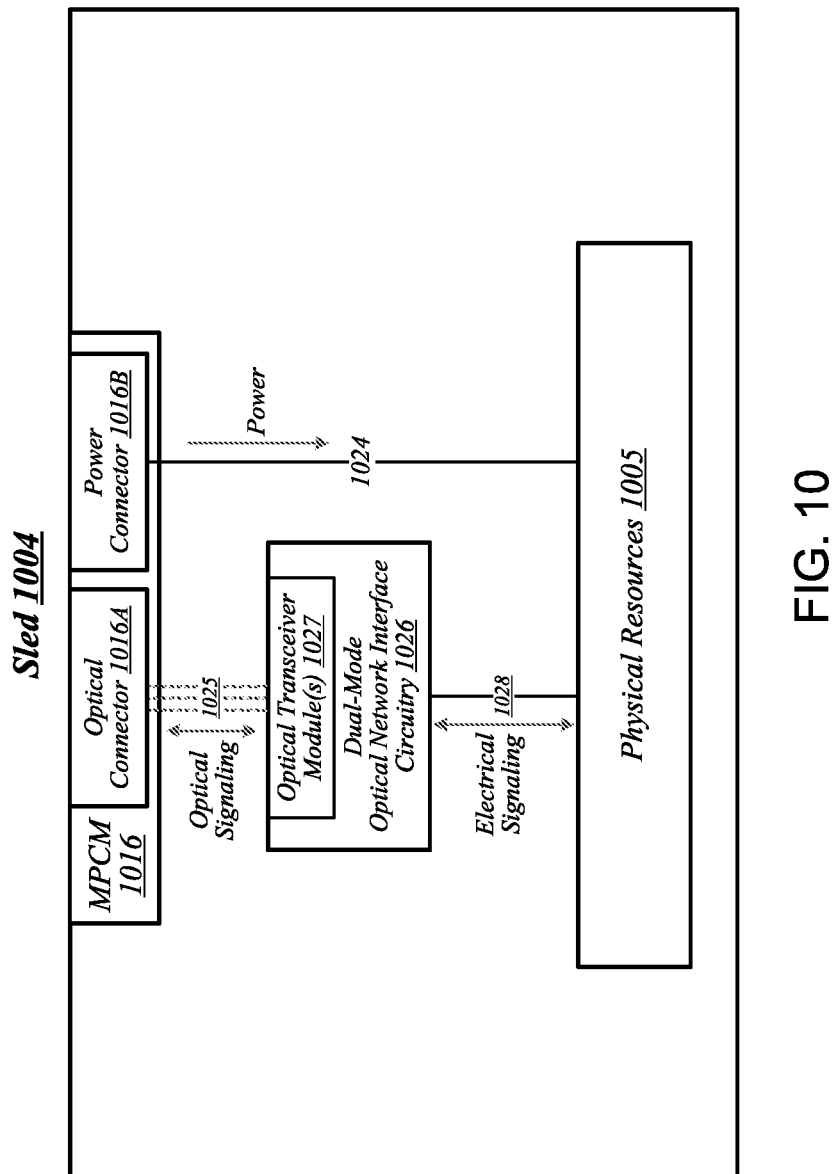
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
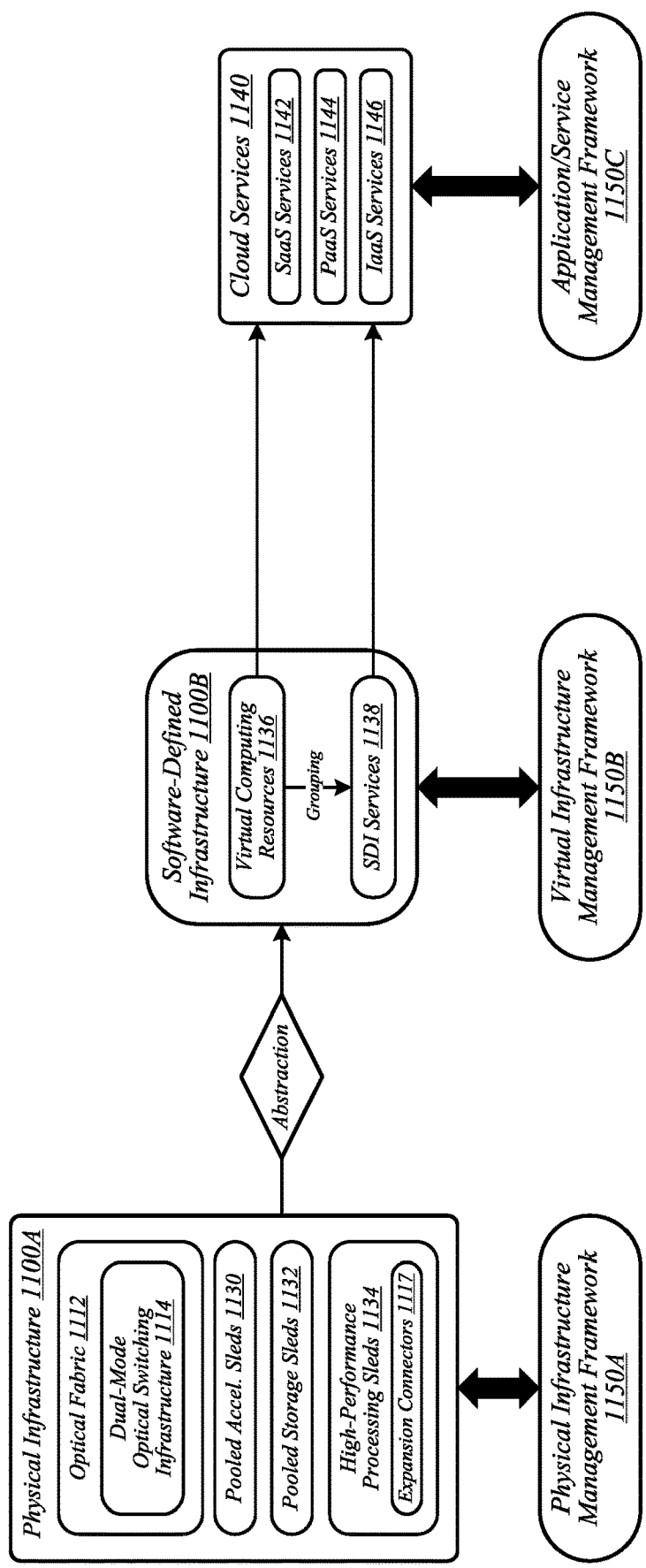
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
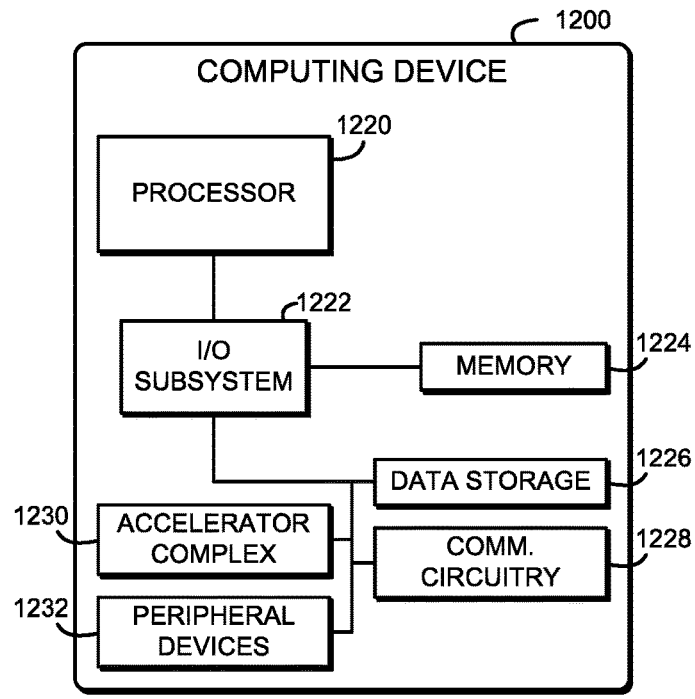
FIG. 12 is a simplified block diagram of at least one embodiment of a computing device for high-ratio compression with heterogeneous history buffers.

Referring now to FIG. 12, an illustrative computing device 1200 for high-ratio compression with heterogeneous history buffers includes a processor 1220, an input/output (I/O) subsystem 1222, a memory 1224, a data storage device 1226, and an accelerator complex 1230. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, the computing device 1200 offloads compression of a data block, data stream, or other uncompressed data to the accelerator complex 1230. The accelerator complex 1230 compresses the data block with a lossless compression algorithm such as DEFLATE, using high-performance parallel hardware resources. In particular, the accelerator complex 1230 includes multiple compare cores that search for strings matching the current uncompressed input in a history buffer. One or more of the compare cores searches for matches in larger history buffers (e.g., a 1 MB or larger history buffer), and the other compare cores search for matches in smaller history buffers (e.g., a 32 kB or smaller history buffer). The larger-buffer compare cores may forward matches to the smaller-buffer compare cores, and the best matches from each compare core are merged and coalesced into compressed output data. Thus, the accelerator complex 1230 may provide improved compression ratio performance over hardware solutions that include only the smaller-sized history buffers. Additionally, the accelerator complex 1230 may require smaller die area or otherwise require fewer hardware resources compared to hardware solutions that include only larger-sized history buffers. Thus, the accelerator complex 1230 may provide desirable performance-to-cost attributes for high-throughput cloud servers and other data center computing devices. Improved hardware compression capabilities may in turn reduce bandwidth pressure on network infrastructure, reduce storage costs, and/or otherwise improve data center infrastructure.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

The accelerator complex 1230 may be embodied as any coprocessor, application-specific integrated circuit (ASIC), field-programmable gate array (FPGA), functional block, IP core, or other hardware accelerator of the computing device 1200 capable of compressing data and otherwise performing the functions described herein. In particular, the accelerator complex 1230 may include multiple history buffers of differing sizes and corresponding compare cores, as described further below. The accelerator complex 1230 may communicate uncompressed input data and compressed output data by performing one or more direct memory access (DMA) operations to the memory 1224 or by otherwise communicating with the processor 1220. Additionally or alternatively, although illustrated as a separate component, it should be understood that in some embodiments the accelerator complex 1230 may be integrated with or otherwise form a portion of one or more other components of the computing device 1200, such as the processor 1220 and/or the I/O subsystem 1222.

The computing device 1200 may further include one or more peripheral devices 1232. The peripheral devices 1232 may include any number of additional input/output devices, interface devices, hardware accelerators, and/or other peripheral devices. For example, in some embodiments, the peripheral devices 1232 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
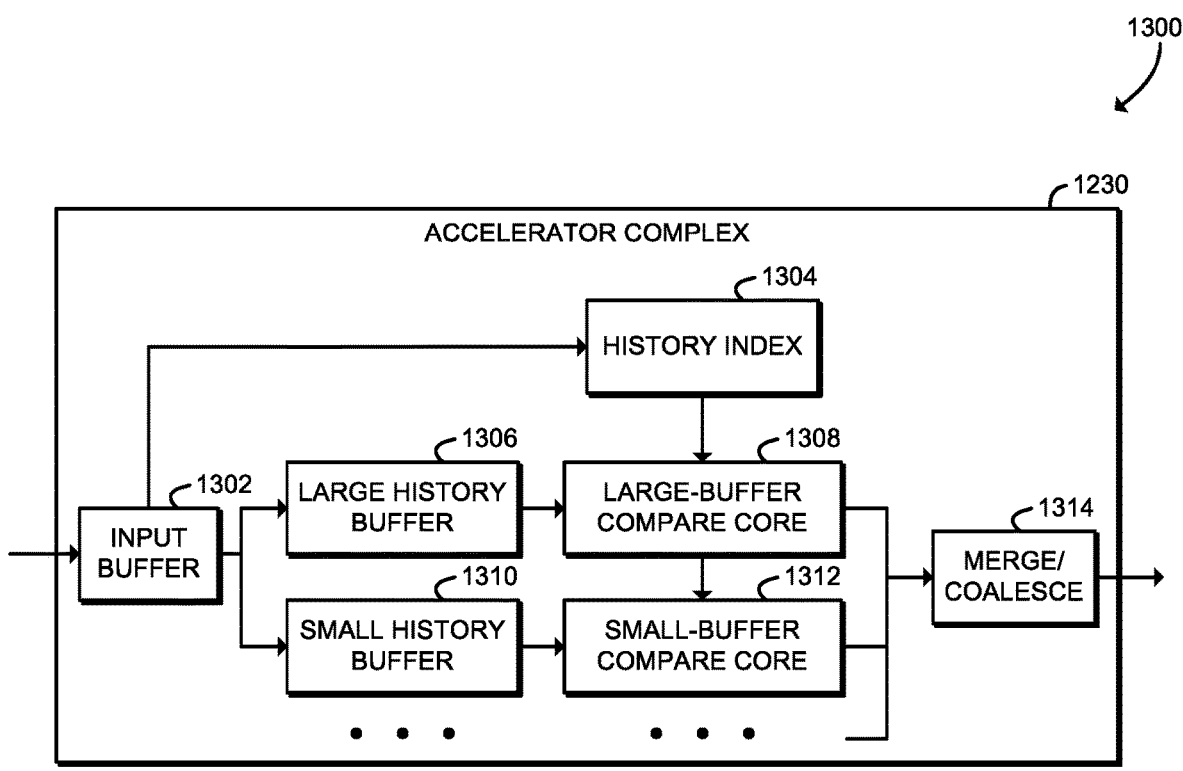
FIG. 13 is a simplified block diagram of at least one embodiment of an accelerator complex of the computing device of FIG. 12.

Referring now to FIG. 13, diagram 1300 shows an illustrative embodiment of the accelerator complex 1230. As shown, the accelerator complex 1230 illustratively includes an input buffer 1302 and a history index 1304. The input buffer 1302 is coupled to a large history buffer 1306, which is coupled to a large-buffer compare core 1308. The input buffer 1302 is also coupled to a small history buffer 1310, which is coupled to a small-buffer compare core 1312. The compare cores 1308, 1312 are coupled to the history index 1304 and to a merge/coalesce logic 1314. The various components of the accelerator complex 1230 may be embodied as hardware, firmware, embedded software, or a combination thereof. As such, in some embodiments, the various components of the accelerator complex 1230 may be embodied as logic blocks, memory blocks, digital logic components, logic gates, circuitry, or other collection of electrical devices. Additionally, in some embodiments, one or more of the illustrative components may form a portion of another component and/or one or more of the illustrative components may be independent of one another.

The input buffer 1302 may be embodied as any memory device, such as an on-die SRAM device. The input buffer 1302 stores uncompressed input data, which may retrieved from the memory 1224 using one or more DMA operations, provided by the processor 1220 to the accelerator complex 1230, or otherwise accessed by the accelerator complex 1230. The input buffer 1302 may store the uncompressed input data at a current input position, which may be a current byte offset in an input data stream or other location in the input data. The input buffer 1302 may also include and/or be coupled to one or more lookahead buffers, which store uncompressed input data beyond the current input position. The lookahead buffers may be used by the compare cores 1308, 1312 to identify matches in the input history that match strings in the uncompressed input data, up to a maximum potential match length.

The history index 1304 is configured to index the uncompressed data stored at each location in the input history. The history index 1304 may be embodied as or otherwise contain one or more hash tables, spill tables, table updaters, and/or or table walkers. For example, one or more hash tables may be indexed with the hash of a string of uncompressed input data and may store the location in the input history of that uncompressed input data. The spill tables may store overflow entries from the hash tables. The table walkers may be used to retrieve locations in the input history from the hash tables and/or spill tables, and the table updater may update the hash tables and/or spill tables with new uncompressed input data read into the input buffer 1302.

The large history buffer 1306 and the small history buffer 1310 may each be embodied as any memory device, such as an on-die SRAM device. Each of the history buffers 1306, 1310 may store a copy of the uncompressed input data received from the input buffer 1302, and each of the history buffers 1306, 1310 has a fixed storage capacity (i.e., size). The large history buffer 1306 has a larger capacity than the small history buffer 1310. In many embodiments, the small history buffer 1310 has a capacity that is equal to the window size of a compression algorithm, such as 32 kilobytes (kB), which is the size of the history window used in the DEFLATE compression algorithm. For example, the large history buffer 1306 may have a size of 64 kB or 1 megabyte (MB), and the small history buffer 1310 may have a size of 32 kB. Additionally or alternatively, in some embodiments, the large history buffer 1306 may have a capacity that is the same as the size of the history window used in a compression algorithm, such as DEFLATE. For example, the large history buffer 1306 may have a size of 32 kB, and the small history buffer 1310 may have a size of 16 kB.

As shown, the large history buffer 1306 is coupled to the large-buffer compare core 1308 and the small history buffer 1310 is coupled to the small-buffer compare core 1312. Additionally or alternatively, in some embodiments each history buffer 1306, 1310 may be coupled to more than one compare core 1308, 1312, respectively. For example, a dual-port large history buffer 1306 may be coupled to two large-buffer compare cores 1308, and a dual-port small history buffer 1310 may be coupled to two small-buffer compare cores 1312. Additionally, and as described further below, although illustrated with one large history buffer 1306 and one small history buffer 1310, it should be understood that the accelerator complex 1230 may include many more history buffers 1306, 1310 and corresponding compare cores 1308, 1312 that may perform searches in parallel.

The large-buffer compare core 1308 is configured to search for one or more matches in the large history buffer 1306 and to select a best match from those matches. Each match includes a length and a backward distance. The length and the backward distance of each match identify a string in the large history buffer 1306 that matches a string of the uncompressed input data, starting at a current input position of the large-buffer compare core 1308. The large-buffer compare core 1308 is further configured to output the best match to the merge/coalesce logic 1314 and to forward the best match to one or more small-buffer compare cores 1312. Forwarding the best match to a small-buffer compare core 1312 includes reducing the length of the best match by an offset between the current input position of the large-buffer compare core 1308 and a current input position of the small-buffer compare core 1312.

The small-buffer compare core 1312 is configured to search for one or more matches in the small history buffer 1310. Each match similarly includes a length and a backward distance. The length and the backward distance of each match identify a string in the small history buffer 1310 that matches a string of the uncompressed input data starting at the current position of the small-buffer compare core 1312. The small-buffer compare core 1312 is further configured to receive the match forwarded from the large-buffer compare core 1308, select a best match from the matches found by the small-buffer compare core 1312 and the match received from the large-buffer compare core 1308, and output the best match to the merge/coalesce logic 1314.

The merge/coalesce logic 1314 is configured to merge the matches output by the compare cores 1308, 1312 to generate compressed output data. The merge/coalesce logic 1314 may, for example, select one or more matches from the compare cores 1308, 1312, combine or truncate one or more matches, select one or more literals, or otherwise combine the matches into a single output token stream. The merge/coalesce logic 1314 may output a stream of tokens including matches and literals, and/or may Huffman encode or otherwise generate compressed output data based on the stream of tokens. The compressed output data may be stored to the memory 1224 using one or more DMA operations, provided to the processor 1220, or otherwise output by the accelerator complex 1230.

Figure 14:
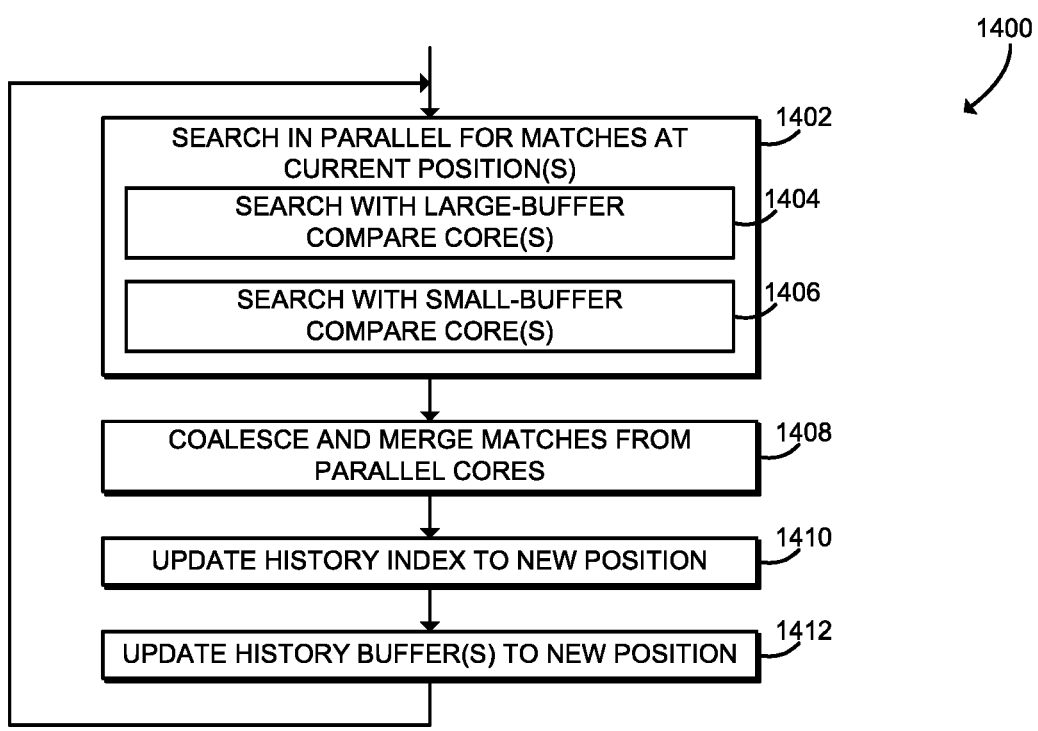
FIG. 14 is a simplified flow diagram of at least one embodiment of a method for parallel, hardware-accelerated data compression that may be executed by the computing device of FIGS. 12-13.

Referring now to FIG. 14, in use, the computing device 1200 may execute a method 1400 for high-ratio compression with heterogeneous history buffers. It should be appreciated that, in some embodiments, the operations of the method 1400 may be performed by one or more components of the accelerator complex 1230 of the computing device 1200 as shown in FIG. 13. The method 1400 begins in block 1402, in which the computing device 1200 searches in parallel for matches to the current uncompressed input data in a sliding history window of the input data. To perform the search, each compare core 1308, 1312 may receive a list of potential matches from the history index 1304. For example, a hash of a predetermined length of uncompressed input data starting at the current input position may be used to index a hash table in order to retrieve the list of potential matches. Each potential match may be identified with a position in the input history (e.g., a backward distance from the current input position). Each compare core 1308, 1312 compares the input history data at the location of the potential match with the uncompressed input data at the current position. The compare core 1308, 1312 may use a lookahead buffer to identify matching data beyond the current position in the uncompressed input data. For each match that is found, the compare core 1308, 1312 identifies a length of the match (e.g., a number of bytes consecutive bytes that match) and a backward distance of the match (e.g., a negative offset in bytes from the current input position to the start of the match in the input history). Multiple compare cores 1308, 1312 may operate in parallel on different positions in the uncompressed input data. For example, core number zero may operate on input position i, core number one may operation on input position i+1, and so on. After identifying one or more matches, each compare core 1308, 1312 identifies and outputs a best match. The compare core 1308, 1312 may use any appropriate heuristic or other scoring algorithm to select the best match; for example, in some embodiments the compare core may select the match with the largest length.

In block 1404, the computing device 1200 performs the parallel search with one or more large-buffer compare cores 1308. After performing a search, each large-buffer compare core 1308 may forward a match to one or more small-buffer compare cores 1312. One potential embodiment of a search method that may be performed by the large-buffer compare cores 1308 is described below in connection with FIG. 15. In block 1406, the computing device 1200 performs the parallel search with one or more small-buffer compare cores 1312. Each small-buffer compare core 1312 may receive a match from a large-buffer compare core 1308 and compare the received match to other matches found by the small-buffer compare core 1312. One potential embodiment of a search method that may be performed by the small-buffer compare cores 1312 is described below in connection with FIG. 16.

In block 1408, the computing device 1200 coalesces and merges the matches received from multiple compare cores 1308, 1312. The computing device 1200 may, for example, select one or more matches from the compare cores 1308, 1312, combine or truncate one or more matches, select one or more literals, or otherwise combine the matches into a single output token stream. The output token stream may include a stream of tokens that identify matches and literals. The computing device 1200 may also Huffman encode the token stream or otherwise output compressed data.

In block 1410, the computing device 1200 updates the history index 1304 to a new position. The computing device 1200, for example, may use a table updater to update one or more hash tables, spill tables, or other index data structures of the history index 1304 based on the contents of the uncompressed input data. The new input position may be advanced past the end of the last match or literal token output by the merge/coalesce logic 1314. In block 1412, the computing device 1200 updates the history buffers 1306, 1310 to the new input location. For example, the computing device 1200 may copy data from the input buffer 1302 to each history buffer 1306, 1310. After updating the history buffers 1306, 1310, the method 1400 loops back to block 1402 to continue searching in parallel for matches starting at the updated input position.

Figure 15:
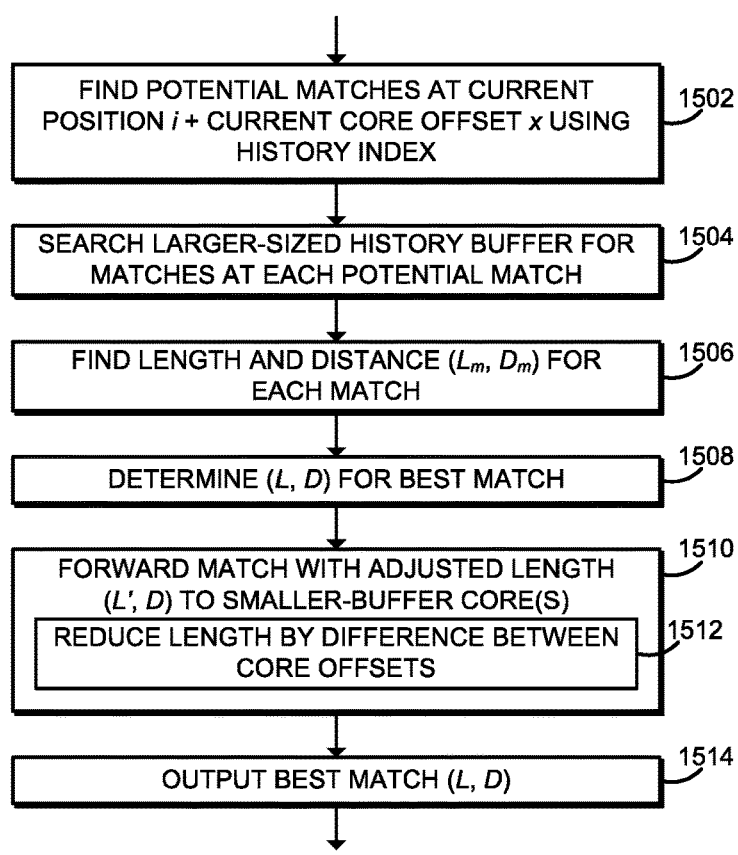
FIG. 15 is a simplified flow diagram of at least one embodiment of a method for a large history buffer search that may be executed by an accelerator complex of the computing device of FIGS. 12-13.

Referring now to FIG. 15, in use, the computing device 1200 may execute a method 1500 for large history buffer search. It should be appreciated that, in some embodiments, the operations of the method 1500 may be performed by one or more components of the accelerator complex 1230 of the computing device 1200 as shown in FIG. 13, such as a large-buffer compare core 1308. The method 1500 begins in block 1502, in which the large-buffer compare core 1308 finds potential matches using the history index 1304. The large-buffer compare core 1308 finds potential matches for the current input position i plus an offset x associated with the current large-buffer compare core 1308. For example, as described above, core number zero may operate on input position i, core number one may operation on input position i+1, and so on. Offsets may be assigned sequentially for all compare cores 1308, 1312 (i.e., the sequence of offsets may also include the small-buffer compare cores 1312).

In block 1504, the large-buffer compare core 1308 searches a large history buffer 1306 for matches at the location of each potential match. For example, the large-buffer compare core 1308 may compare data in the large history buffer 1306 starting at the location of the potential match to data in the input buffer 1302 (or an associated lookahead buffer) to determine whether the data in the history matches the current input data. The large-buffer compare core 1308 may search a dedicated large history buffer 1306 coupled to the large-buffer compare core 1308 or, in some embodiments, a dual-port large history buffer 1306 that is shared by two large-buffer compare cores 1308.

In block 1506, the large-buffer compare core 1308 determines a length and distance (L, D) for each match. For example, if a match is found, the large-buffer compare core 1308 may determine the length of the matching data, up to a maximum length, which may depend on the particular compression format in use. The distance D may be the backward distance in bytes from the current input position i plus the current core offset x, and may be determined using the location of the potential match in the large history buffer 1306.

In block 1508, the large-buffer compare core 1308 determines a length and distance (L, D) for a best match. The large-buffer compare core 1308 may use any appropriate heuristic or other scoring algorithm to select the best match. For example, in some embodiments the compare core may select the match with the largest length L.

In block 1510, the large-buffer compare core 1308 forwards the best match with an adjusted length L' to one or more small-buffer compare cores 1312. As described further below, the forwarded match may have a distance D larger than the maximum distance supported by the small history buffers 1310 and thus may result in a better compression ratio. Accordingly, in some embodiments the large-buffer compare core 1308 may only forward the best match if the distance D exceeds the maximum size of the small history buffer 1310 (e.g., 32 kB). Of course, in many embodiments the best match may always be forwarded to the small-buffer compare cores 1312.

Figure 17:
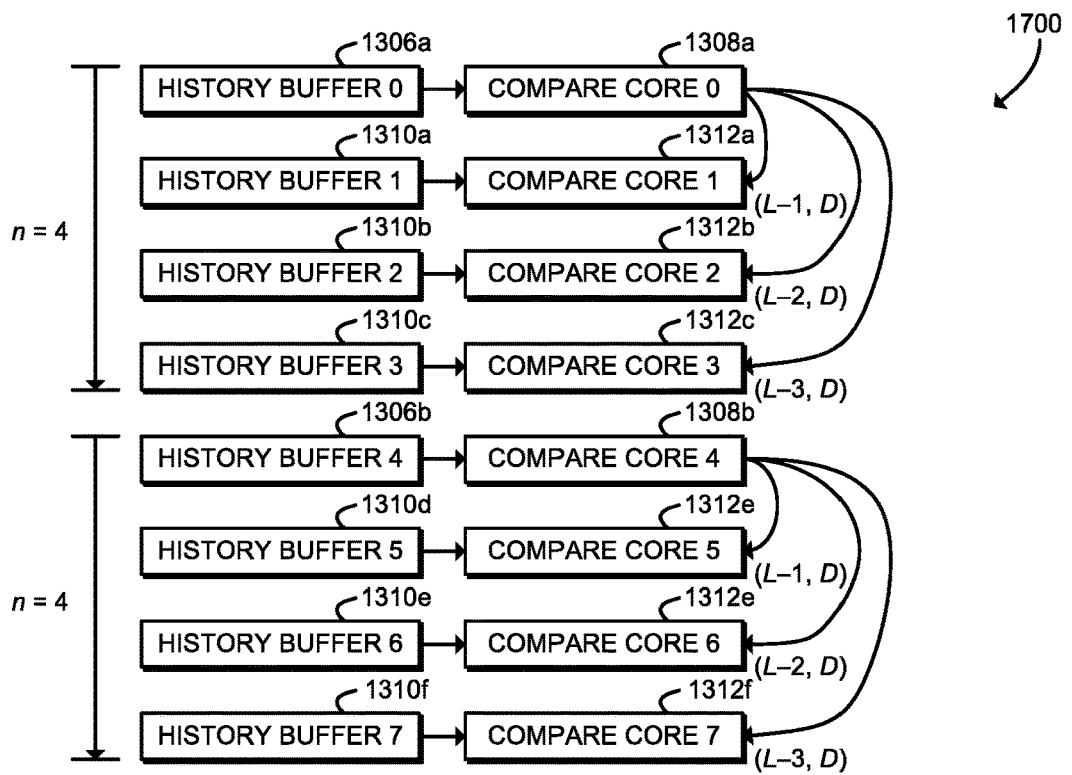
FIG. 17 is a schematic diagram illustrating at least one embodiment of an arrangement of history buffers and compare cores of the accelerator complex of FIGS. 12-13.
Figure 18:
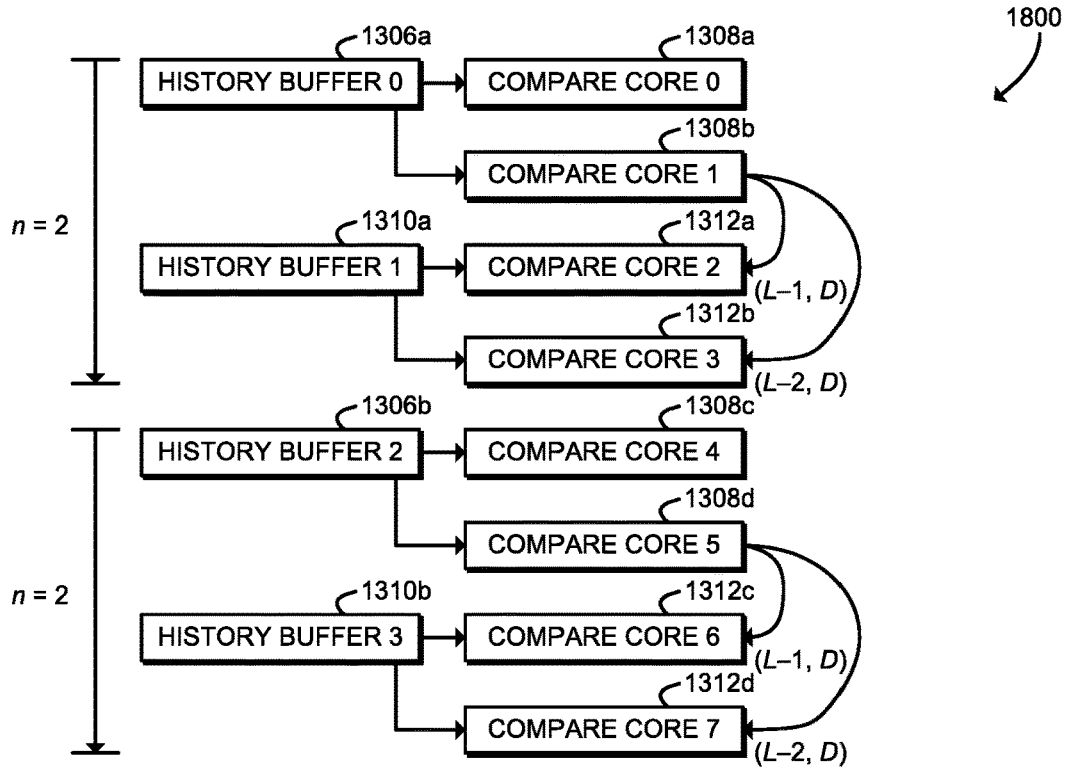
FIG. 18 is a schematic diagram illustrating at least one embodiment of an arrangement of dual-port history buffers and compare cores of the accelerator complex of FIGS. 12-13.

In block 1512, the large-buffer compare core 1308 reduces the length L by the difference between the core offsets x of the large-buffer compare core 1308 and the small-buffer compare core 1312 to generate the adjusted length L'. Reducing the length L ensures that the forwarded match is valid for the input position being searched by the small-buffer compare core 1312. For example, if the large-buffer compare core 1308 is core number zero, it may forward (L-1, D) to core number one, (L-2, D) to core number two, and so on. As another example, if the large-buffer compare core 1308 is core number four, it may forward (L-1, D) to core number five, (L-2, D) to core number six, and so on. In embodiments with a dual-port large history buffer 1306, only one of the large-buffer compare cores 1308 coupled to the large history buffer 1306 may forward matches to the small-buffer compare cores 1312. For example, if cores zero and one are both large-buffer compare cores 1308 coupled to a single large history buffer 1306, then core number zero may not forward any matches, and core number one may forward (L-1, D) to core number two and (L-2, D) to core number three. Examples of forwarding matches are also illustrated in FIGS. 17 and 18, described below.

After forwarding the best match, in block 1514 the large-buffer compare core 1308 outputs the best match (L, D) to the merge/coalesce logic 1314. As described above, the merge/coalesce logic 1314 merges or otherwise combines the matches received from all of the cores 1308, 1312 and outputs compressed output data. After outputting the best match, the method 1500 is completed. The method 1500 may be executed repeatedly for each new input position searched by the large-buffer compare core 1308.

Figure 16:
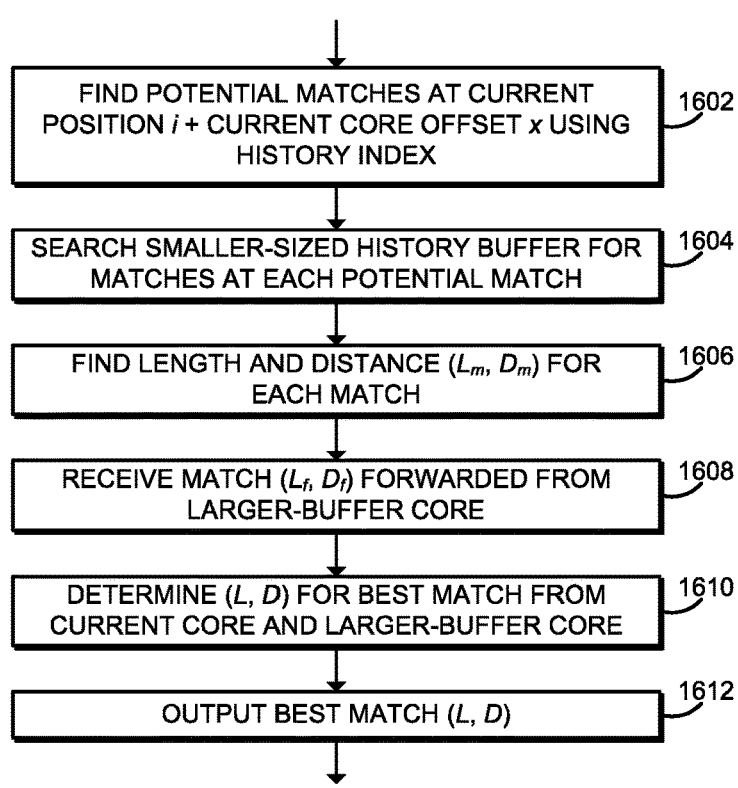
FIG. 16 is a simplified flow diagram of at least one embodiment of a method for a small history buffer search that may be executed by an accelerator complex of the computing device of FIGS. 12-13.

Referring now to FIG. 16, in use, the computing device 1200 may execute a method 1600 for small history buffer search. It should be appreciated that, in some embodiments, the operations of the method 1600 may be performed by one or more components of the accelerator complex 1230 of the computing device 1200 as shown in FIG. 13, such as a small-buffer compare core 1312. The method 1600 begins in block 1602, in which the small-buffer compare core 1312 finds potential matches using the history index 1304. The small-buffer compare core 1312 finds potential matches for the current input position i plus an offset x associated with the current small-buffer compare core 1312. For example, as described above, core number zero may operate on input position i, core number one may operation on input position i+1, and so on. Offsets may be assigned sequentially for all compare cores 1308, 1312 (i.e., the sequence of offsets may also include the large-buffer compare cores 1308).

In block 1604, the small-buffer compare core 1312 searches a small history buffer 1310 for matches at the location of each potential match. For example, the small-buffer compare core 1312 may compare data in the small history buffer 1310 starting at the location of the potential match to data in the input buffer 1302 (or an associated lookahead buffer) to determine whether the data in the history matches the current input data. The small-buffer compare core 1312 may search a dedicated small history buffer 1310 coupled to the small-buffer compare core 1312 or, in some embodiments, a dual-port small history buffer 1310 that is shared by two small-buffer compare cores 1312.

In block 1606, the small-buffer compare core 1312 determines a length and distance ($L_m$, $D_m$) for each match. For example, if a match is found, the small-buffer compare core 1312 may determine the length of the matching data, up to a maximum length, which may depend on the particular compression format in use. The distance $D_m$ may be the backward distance in bytes from the current input position i plus the current core offset x, and may be determined using the location of the potential match in the small history buffer 1310.

In block 1608, the small-buffer compare core 1312 receives a match ($L_f$, $D_f$) forwarded from a large-buffer compare core 1308. As described above in connection with block 1510 of FIG. 15, the large-buffer compare core 1308 forwards its best match to the small-buffer compare core 1312. As further described above, the length $L_f$ of the forwarded match has been adjusted to be valid for the small-buffer compare core 1312.

In block 1610, the small-buffer compare core 1312 determines a length and distance (L, D) for a best match of the matches ($L_m$, $D_m$) found by the small-buffer compare core 1312 and the match ($L_f, D_f$) forwarded from the large-buffer compare core 1308. The small-buffer compare core 1312 may use any appropriate heuristic or other scoring algorithm to select the best match. For example, in some embodiments the compare core may select the match with the largest length L. Thus, the small-buffer compare core 1312 may select a best match that was actually found by a different compare core 1308 if that match has a better score than the matches found by the small-buffer compare core 1312. Accordingly, the small-buffer compare core 1312 may select a best match with a distance D that is greater than the maximum distance supported by the small history buffer 1310.

After determining the best match, in block 1612 the small-buffer compare core 1312 outputs the best match (L, D) to the merge/coalesce logic 1314. As described above, the merge/coalesce logic 1314 merges or otherwise combines the matches received from all of the cores 1308, 1312 and outputs compressed output data. After outputting the best match, the method 1600 is completed. The method 1600 may be executed repeatedly for each new input position searched by the small-buffer compare core 1312.

Referring now to FIG. 17, schematic diagram 1700 illustrates one potential arrangement of history buffers and compare cores of the accelerator complex 1230. As shown, the accelerator complex 1230 includes eight single-ported history buffers 1306, 1310 and eight corresponding compare cores 1308, 1312. Every fourth history buffer 1306, 1310 is a large history buffer 1306; therefore, as shown the accelerator complex 230 has a stride n equal to four, with two repeating groups of history buffers 1306, 1310 and compare cores 1308, 1312. As shown, the first group includes a large history buffer 1306*a* coupled to a large-buffer core 1308*a* as well as small history buffers 1310*a*, 1310*b*, 1310*c* coupled to small-buffer cores 1312*a*, 1312*b*, 1312*c*, respectively. As described above, the large-buffer core 1308*a* may forward a match (L-1, D) to small-buffer core 1312*a*, a match (L-2, D) to small-buffer core 1312*b*, and a match (L-3, D) to small-buffer core 1312*c*. Similarly, the second group includes a large history buffer 1306*b* coupled to a large-buffer core 1308*b* as well as small history buffers 1310*d*, 1310*e*, 1310*f* coupled to small-buffer cores 1312*d*, 1312*e*, 1312*f*, respectively. As described above, the large-buffer core 1308*b* may forward a match (L-1, D) to small-buffer core 1312*d*, a match (L-2, D) to small-buffer core 1312*e*, and a match (L-3, D) to small-buffer core 1312*f*. Although illustrated with two groups of four history buffers 1306, 1310 and compare cores 1308, 1312, it should be understood that in some embodiments the accelerator complex 230 may include many more groups of history buffers 1306, 1310 and compare cores 1308, 1312.

Referring now to FIG. 18, schematic diagram 1800 illustrates one potential arrangement of dual-port history buffers and compare cores of the accelerator complex 1230. As shown, the accelerator complex 1230 includes four dual-ported history buffers 1306, 1310 and eight corresponding compare cores 1308, 1312. Every other history buffer 1306, 1310 is a large history buffer 1306; therefore, as shown the accelerator complex 230 has a stride n equal to two, with two repeating groups of history buffers 1306, 1310 and compare cores 1308, 1312. As shown, the first group includes a large history buffer 1306*a* coupled to large-buffer cores 1308*a*, 1308*b* as well as a small history buffer 1310*a* coupled to small-buffer cores 1312*a*, 1312*b*. As described above, the large-buffer core 1308*b* may forward a match (L-1, D) to small-buffer core 1312*a* and a match (L-2, D) to small-buffer core 1312*b*. Similarly, the second group includes a large history buffer 1306*b* coupled to large-buffer cores 1308*c*, 1308*d* as well as a small history buffer 1310*b* coupled to small-buffer cores 1312*c*, 1312*d*. As described above, the large-buffer core 1308*d* may forward a match (L-1, D) to small-buffer core 1312*c* and a match (L-2, D) to small-buffer core 1312*d*. Although illustrated with two groups of history buffers 1306, 1310 and compare cores 1308, 1312, it should be understood that in some embodiments the accelerator complex 230 may include many more groups of history buffers 1306, 1310 and compare cores 1308, 1312.

Figure 19:
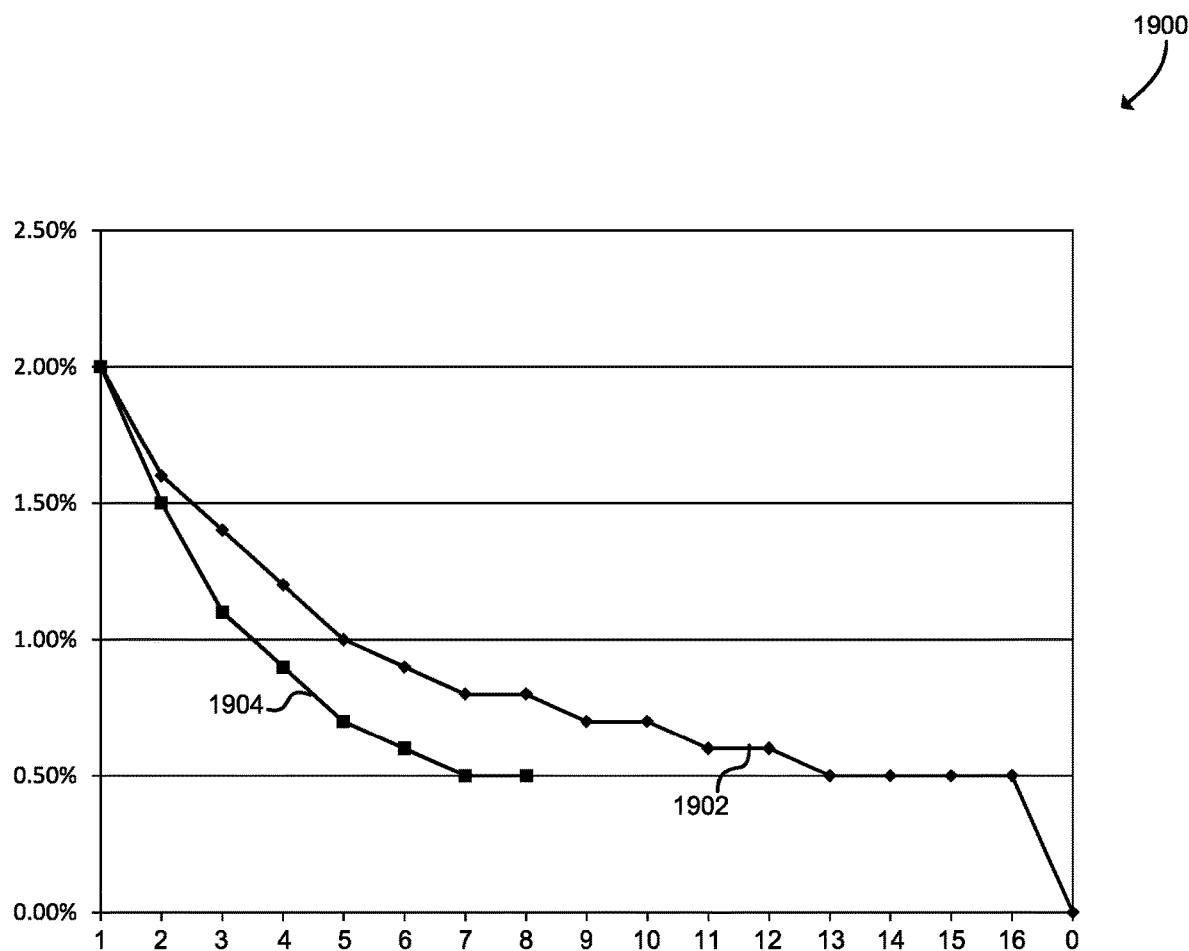
FIG. 19 is a plot illustrating experimental results that may be achieved by the computing device of FIGS. 12-13.

Referring now to FIG. 19, plot 1900 illustrates experimental results that may be achieved by at least one potential embodiment the computing device 1200. In the illustrative experiment, the large history buffers 1306 have a size of 64 kB and the small history buffers 1310 have a size of 32 kB. The compression format used is LZ4, which defines a 64 kB history size. The experiment is performed using the Calgary sample data set. The history buffers 1306, 1310 were configured with stride n, meaning that every nth history buffer was a large history buffer 1306. In other words, for n=1, every history buffer had size 64 kB, for n=2 every other history buffer had size 64 kB, for n=3, every third history buffer had size 64 kB, and so on. For n=0, only small history buffers of size 32 kB were used, which is essentially a control configuration.

The plot 1900 shows normalized compression ratio achieved versus history buffer configuration. In particular, the vertical axis shows the compression ratio achieved subtracted from the compression ratio for n=0. In other words, the vertical axis shows percent improvement over compression using only 32 kB history buffers. The horizontal axis shows the stride n. The curve 1902 shows results for single-port history buffers 1306, 1310. The curve 1904 shows results for dual-port history buffers 1306, 1310. As shown, using all 64 kB history buffers (i.e., n=1) improves compression ratio by about 2%. Reducing the number of 64 kB history buffers by half (i.e., n=2) improves compression ratio by about 1.5%. Accordingly, halving the number of large history buffers may provide the majority of the improvement in compression ratio at half of the hardware cost of extending the history size.

EXAMPLES

Illustrative examples of the technologies disclosed herein are provided below. An embodiment of the technologies may include any one or more, and any combination of, the examples described below.

Example 1 includes a computing device for data compression, the computing device comprising: a first history buffer coupled to a first compare core, wherein the first history buffer has a first size; and a second history buffer coupled to a second compare core, wherein the second history buffer has a second size that is less than the first size; wherein the first compare core is to (i) search for a first match in the first history buffer, wherein the first match comprises a length and a backward distance, (ii) output the first match, and (iii) forward the first match to the second compare core, wherein to forward the first match comprises to reduce the length of the first match by an offset between a current input position of the first compare core and a current input position of the second compare core; and wherein the second compare core is to (i) search for a second match in the second history buffer, wherein the second match comprises a length and a backward distance, (ii) select a best match from the first match and the second match, and (iii) output the best match.

Example 2 includes the subject matter of Example 1, and wherein: the length and the backward distance of the first match identify a string in the first history buffer that matches a string of an uncompressed input data starting at the current input position of the first compare core; and the length and the backward distance of the second match identify a string in the second history buffer that matches a string of the uncompressed input data starting at the current position of the second compare core.

Example 3 includes the subject matter of any of Examples 1 and 2, and wherein the second size comprises a compression algorithm history window size.

Example 4 includes the subject matter of any of Examples 1-3, and wherein the compression algorithm history window size comprises a DEFLATE algorithm history window size.

Example 5 includes the subject matter of any of Examples 1-4, and wherein the second size comprises 32 kilobytes.

Example 6 includes the subject matter of any of Examples 1-5, and wherein the first size comprises a compression algorithm history window size.

Example 7 includes the subject matter of any of Examples 1-6, and wherein the compression algorithm history window size comprises a DEFLATE algorithm history window size.

Example 8 includes the subject matter of any of Examples 1-7, and wherein the first size comprises 32 kilobytes.

Example 9 includes the subject matter of any of Examples 1-8, and wherein the first size comprises 1 megabyte and the second size comprises 32 kilobytes.

Example 10 includes the subject matter of any of Examples 1-9, and wherein: the first compare core is further to (i) search for a plurality of matches in the first history buffer, wherein to search for the plurality of matches comprises to search for the first match, and (ii) select a best match from the plurality of matches, wherein the first match comprises the best match; wherein to forward the first match to the second compare core comprises to forward the best match in response to selecting the best match.

Example 11 includes the subject matter of any of Examples 1-10, and further comprising: a plurality of compare cores, wherein each of the plurality of compare cores is coupled to a history buffer with a size that is less than the first size, and wherein the plurality of compare cores comprises the second compare core; wherein the first compare core is further to forward the first match to the plurality of compare cores.

Example 12 includes the subject matter of any of Examples 1-11, and further comprising a third compare core coupled to the first history buffer, wherein the third compare core is to (i) search for a third match in the first history buffer, and (ii) output the third match.

Example 13 includes the subject matter of any of Examples 1-12, and further comprising a merge/coalesce logic to merge the first match output by the first compare core and the best match output by the second compare core to generate compressed output data.

Example 14 includes a method for data compression, the method comprising: searching, by a first compare core of a computing device, for a first match in a first history buffer, wherein the first history buffer has a first size, and wherein the first match comprises a length and a backward distance; outputting, by the first compare core, the first match; forwarding, by the first compare core, the first match to a second compare core of the computing device, wherein forwarding the first match comprises reducing the length of the first match by an offset between a current input position of the first compare core and a current input position of the second compare core; searching, by the second compare core, for a second match in a second history buffer, wherein the second history buffer has a second size that is less than the first size, and wherein the second match comprises a length and a backward distance; selecting, by the second compare core, a best match from the first match and the second match; and outputting, by the second compare core, the best match.

Example 15 includes the subject matter of any of Example 14, and wherein: the length and the backward distance of the first match identify a string in the first history buffer that matches a string of an uncompressed input data starting at the current input position of the first compare core; and the length and the backward distance of the second match identify a string in the second history buffer that matches a string of the uncompressed input data starting at the current position of the second compare core.

Example 16 includes the subject matter of any of Examples 14 and 15, and wherein the second size comprises a compression algorithm history window size.

Example 17 includes the subject matter of any of Examples 14-16, and wherein the compression algorithm history window size comprises a DEFLATE algorithm history window size.

Example 18 includes the subject matter of any of Examples 14-17, and wherein the second size comprises 32 kilobytes.

Example 19 includes the subject matter of any of Examples 14-18, and wherein the first size comprises a compression algorithm history window size.

Example 20 includes the subject matter of any of Examples 14-19, and wherein the compression algorithm history window size comprises a DEFLATE algorithm history window size.

Example 21 includes the subject matter of any of Examples 14-20, and wherein the first size comprises 32 kilobytes.

Example 22 includes the subject matter of any of Examples 14-21, and wherein the first size comprises 1 megabyte and the second size comprises 32 kilobytes.

Example 23 includes the subject matter of any of Examples 14-22, and further comprising: searching, by the first compare core, for a plurality of matches in the first history buffer, wherein searching for the plurality of matches comprises searching for the first match; and selecting, by the first compare core, a best match from the plurality of matches, wherein the first match comprises the best match; wherein forwarding the first match to the second compare core comprises forwarding the best match in response to selecting the best match.

Example 24 includes the subject matter of any of Examples 14-23, and further comprising forwarding, by the first compare core, the first match to a plurality of compare cores of the computing device, wherein forwarding the first match to the plurality of compare cores comprises forwarding the first match to the second compare core, and wherein each of the plurality of compare cores searches a history buffer with a size that is less than the first size.

Example 25 includes the subject matter of any of Examples 14-24, and further comprising: searching, by a third compare core of the computing device, for a third match in the first history buffer; and outputting, by the third compare core, the third match.

Example 26 includes the subject matter of any of Examples 14-25, and further comprising merging, by the computing device, the first match output by the first compare core and the best match output by the second compare core to generate compressed output data.

Example 27 includes a computing device comprising: a processor; and a memory having stored therein a plurality of instructions that when executed by the processor cause the computing device to perform the method of any of Examples 14-26.

Example 28 includes one or more non-transitory, computer readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for data compression, the computing device comprising: means for searching, by a first compare core of the computing device, for a first match in a first history buffer, wherein the first history buffer has a first size, and wherein the first match comprises a length and a backward distance; means for outputting, by the first compare core, the first match; means for forwarding, by the first compare core, the first match to a second compare core of the computing device, wherein forwarding the first match comprises reducing the length of the first match by an offset between a current input position of the first compare core and a current input position of the second compare core; means for searching, by the second compare core, for a second match in a second history buffer, wherein the second history buffer has a second size that is less than the first size, and wherein the second match comprises a length and a backward distance; means for selecting, by the second compare core, a best match from the first match and the second match; and means for outputting, by the second compare core, the best match.

Example 31 includes the subject matter of Example 30, and wherein: the length and the backward distance of the first match identify a string in the first history buffer that matches a string of an uncompressed input data starting at the current input position of the first compare core; and the length and the backward distance of the second match identify a string in the second history buffer that matches a string of the uncompressed input data starting at the current position of the second compare core.

Example 32 includes the subject matter of any of Examples 30 and 31, and wherein the second size comprises a compression algorithm history window size.

Example 33 includes the subject matter of any of Examples 30-32, and wherein the compression algorithm history window size comprises a DEFLATE algorithm history window size.

Example 34 includes the subject matter of any of Examples 30-33, and wherein the second size comprises 32 kilobytes.

Example 35 includes the subject matter of any of Examples 30-34, and wherein the first size comprises a compression algorithm history window size.

Example 36 includes the subject matter of any of Examples 30-35, and wherein the compression algorithm history window size comprises a DEFLATE algorithm history window size.

Example 37 includes the subject matter of any of Examples 30-36, and wherein the first size comprises 32 kilobytes.

Example 38 includes the subject matter of any of Examples 30-37, and wherein the first size comprises 1 megabyte and the second size comprises 32 kilobytes.

Example 39 includes the subject matter of any of Examples 30-38, and further comprising: means for searching, by the first compare core, for a plurality of matches in the first history buffer, wherein searching for the plurality of matches comprises searching for the first match; and means for selecting, by the first compare core, a best match from the plurality of matches, wherein the first match comprises the best match; wherein the means for forwarding the first match to the second compare core comprises means for forwarding the best match in response to selecting the best match.

Example 40 includes the subject matter of any of Examples 30-39, and further comprising means for forwarding, by the first compare core, the first match to a plurality of compare cores of the computing device, wherein the means for forwarding the first match to the plurality of compare cores comprises means for forwarding the first match to the second compare core, and wherein each of the plurality of compare cores searches a history buffer with a size that is less than the first size.

Example 41 includes the subject matter of any of Examples 30-40, and further comprising: means for searching, by a third compare core of the computing device, for a third match in the first history buffer; and means for outputting, by the third compare core, the third match.

Example 42 includes the subject matter of any of Examples 30-41, and further comprising means for merging, by the computing device, the first match output by the first compare core and the best match output by the second compare core to generate compressed output data.

The invention claimed is:

1. A computing device for data compression, the computing device comprising:
   a first history buffer coupled to a first compare core, wherein the first history buffer has a first size; and
   a second history buffer coupled to a second compare core, wherein the second history buffer has a second size that is less than the first size;
   wherein the first compare core is to (i) search for a first match in the first history buffer, wherein the first match comprises a length and a backward distance, (ii) output the first match, and (iii) forward the first match to the second compare core, wherein to forward the first match comprises to reduce the length of the first match by an offset between a current input position of the first compare core and a current input position of the second compare core; and
   wherein the second compare core is to (i) search for a second match in the second history buffer, wherein the second match comprises a length and a backward distance, (ii) select a best match from the first match and the second match, wherein the best match has a largest length of the first match and the second match, and (iii) output the best match.

2. The computing device of claim 1, wherein:
   the length and the backward distance of the first match identify a string in the first history buffer that matches a string of an uncompressed input data starting at the current input position of the first compare core; and
   the length and the backward distance of the second match identify a string in the second history buffer that matches a string of the uncompressed input data starting at the current position of the second compare core.

3. The computing device of claim 1, wherein the second size comprises a compression algorithm history window size.

4. The computing device of claim 3, wherein the compression algorithm history window size comprises a DEFLATE algorithm history window size.

5. The computing device of claim 3, wherein the second size comprises 32 kilobytes.

6. The computing device of claim 1, wherein the first size comprises a compression algorithm history window size.

7. The computing device of claim 6, wherein the compression algorithm history window size comprises a DEFLATE algorithm history window size.

8. The computing device of claim 6, wherein the first size comprises 32 kilobytes.

9. The computing device of claim 1, wherein the first size comprises 1 megabyte and the second size comprises 32 kilobytes.

10. The computing device of claim 1, wherein:
the first compare core is further to (i) search for a plurality of matches in the first history buffer, wherein to search for the plurality of matches comprises to search for the first match, and (ii) select a best match from the plurality of matches, wherein the first match comprises the best match;
wherein to forward the first match to the second compare core comprises to forward the best match in response to selecting the best match.

11. The computing device of claim 1, further comprising:
a plurality of compare cores, wherein each of the plurality of compare cores is coupled to a history buffer with a size that is less than the first size, and wherein the plurality of compare cores comprises the second compare core;
wherein the first compare core is further to forward the first match to the plurality of compare cores.

12. The computing device of claim 1, further comprising a third compare core coupled to the first history buffer, wherein the third compare core is to (i) search for a third match in the first history buffer, and (ii) output the third match.

13. The computing device of claim 1, further comprising a merge/coalesce logic to merge the first match output by the first compare core and the best match output by the second compare core to generate compressed output data.

14. A method for data compression, the method comprising:
searching, by a first compare core of a computing device, for a first match in a first history buffer, wherein the first history buffer has a first size, and wherein the first match comprises a length and a backward distance;
outputting, by the first compare core, the first match;
forwarding, by the first compare core, the first match to a second compare core of the computing device, wherein forwarding the first match comprises reducing the length of the first match by an offset between a current input position of the first compare core and a current input position of the second compare core;
searching, by the second compare core, for a second match in a second history buffer, wherein the second history buffer has a second size that is less than the first size, and wherein the second match comprises a length and a backward distance;

selecting, by the second compare core, a best match from the first match and the second match, wherein the best match has a largest length of the first match and the second match; and
outputting, by the second compare core, the best match.

15. The method of claim 14, wherein:
the length and the backward distance of the first match identify a string in the first history buffer that matches a string of an uncompressed input data starting at the current input position of the first compare core; and
the length and the backward distance of the second match identify a string in the second history buffer that matches a string of the uncompressed input data starting at the current position of the second compare core.

16. The method of claim 14, wherein the second size comprises a compression algorithm history window size.

17. The method of claim 14, wherein the first size comprises a compression algorithm history window size.

18. The method of claim 14, further comprising:
searching, by the first compare core, for a plurality of matches in the first history buffer, wherein searching for the plurality of matches comprises searching for the first match; and
selecting, by the first compare core, a best match from the plurality of matches, wherein the first match comprises the best match;
wherein forwarding the first match to the second compare core comprises forwarding the best match in response to selecting the best match.

19. The method of claim 14, further comprising forwarding, by the first compare core, the first match to a plurality of compare cores of the computing device, wherein forwarding the first match to the plurality of compare cores comprises forwarding the first match to the second compare core, and wherein each of the plurality of compare cores searches a history buffer with a size that is less than the first size.

20. An accelerator complex for data compression, the accelerator complex comprising:
a first history buffer coupled to a first compare core, wherein the first history buffer has a first size; and
a second history buffer coupled to a second compare core, wherein the second history buffer has a second size that is less than the first size;
wherein the first compare core is to (i) search for a first match in the first history buffer, wherein the first match comprises a length and a backward distance, (ii) output the first match, and (iii) forward the first match to the second compare core, wherein to forward the first match comprises to reduce the length of the first match by an offset between a current input position of the first compare core and a current input position of the second compare core; and
wherein the second compare core is to (i) search for a second match in the second history buffer, wherein the second match comprises a length and a backward distance, (ii) select a best match from the first match and the second match, wherein the best match has a largest length of the first match and the second match, and (iii) output the best match.

21. The accelerator complex of claim 20, further comprising an input buffer, wherein:
the length and the backward distance of the first match identify a string in the first history buffer that matches a string of in the input buffer starting at the current input position of the first compare core; and
the length and the backward distance of the second match identify a string in the second history buffer that matches a string in the input buffer starting at the current position of the second compare core.

22. The accelerator complex of claim 20, wherein the second size comprises a compression algorithm history window size.

23. The accelerator complex of claim 20, wherein the first size comprises a compression algorithm history window size.

24. The accelerator complex of claim 20, wherein:
the first compare core is further to (i) search for a plurality of matches in the first history buffer, wherein to search for the plurality of matches comprises to search for the first match, and (ii) select a best match from the plurality of matches, wherein the first match comprises the best match;
wherein to forward the first match to the second compare core comprises to forward the best match in response to selecting the best match.

25. The accelerator complex of claim 20, further comprising:
a plurality of compare cores, wherein each of the plurality of compare cores is coupled to a history buffer with a size that is less than the first size, and wherein the plurality of compare cores comprises the second compare core;
wherein the first compare core is further to forward the first match to the plurality of compare cores.

* * * * *